(12) United States Patent
Wei et al.

(10) Patent No.: US 12,331,830 B2
(45) Date of Patent: Jun. 17, 2025

(54) METHOD FOR ACTUATING A HYDRAULIC DEVICE

(71) Applicant: Schaeffler Technologies AG & Co. KG, Herzogenaurach (DE)

(72) Inventors: Yunfan Wei, Bühl (DE); Oliver Rink, Karlsruhe (DE); Carsten Mayer, Lohr a. Main (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 291 days.

(21) Appl. No.: 17/907,984

(22) PCT Filed: Feb. 23, 2021

(86) PCT No.: PCT/DE2021/100177
§ 371 (c)(1),
(2) Date: Aug. 30, 2022

(87) PCT Pub. No.: WO2021/175366
PCT Pub. Date: Sep. 10, 2021

(65) Prior Publication Data
US 2023/0151807 A1 May 18, 2023

(30) Foreign Application Priority Data
Mar. 4, 2020 (DE) .................... 10 2020 105 820.9

(51) Int. Cl.
*F16H 61/00* (2006.01)
*F04B 49/06* (2006.01)
(Continued)

(52) U.S. Cl.
CPC ....... *F16H 61/0031* (2013.01); *F04B 49/065* (2013.01); *F15B 11/17* (2013.01);
(Continued)

(58) Field of Classification Search
CPC ......... F16H 61/0031; F16H 2061/0037; F16H 57/0473; F16H 61/688; F16H 57/0435;
(Continued)

(56) References Cited

U.S. PATENT DOCUMENTS 8,915,344 B2 * 12/2014 Schuller .............. F16H 61/0021
192/3.63
9,581,177 B2 * 2/2017 Schuller .............. F16H 57/0473
(Continued)

FOREIGN PATENT DOCUMENTS

CA 2831759 A1 1/2014
CN 101949381 A 1/2011
(Continued)

*Primary Examiner* — Peter J Bertheaud
(74) *Attorney, Agent, or Firm* — Price Heneveld LLP

(57) ABSTRACT

Actuation of a hydraulic device that provides a hydraulic supply to a torque-transmitting device is provided. An electrically operated pump is operated in a first operating state. The first operating state has a primary pump rotational speed that provides a first fluid pressure to the torque-transmitting device via a fluid tract. A switchover process is initiated to operate the electrically operated pump device in a second operating state based on a second fluid pressure and a second fluid target pressure. The second operating state has a secondary pump rotational speed that provides the second fluid pressure to the torque-transmitting device via the fluid tract. During operation of the hydraulic device, the secondary pump rotational speed for the switchover process is determined based on a first power value. The first power value includes electrical pump power of the pump device in a preceding switchover process.

19 Claims, 3 Drawing Sheets

(51) Int. Cl.
*F04B 49/08* (2006.01)
*F04B 49/20* (2006.01)
*F15B 11/17* (2006.01)
*F16D 25/12* (2006.01)
*F16D 48/02* (2006.01)
*F16D 48/06* (2006.01)
*F16H 57/04* (2010.01)
*F16H 61/688* (2006.01)

(52) U.S. Cl.
CPC .......... *F16D 25/123* (2013.01); *F16D 48/02* (2013.01); *F16D 48/0206* (2013.01); *F16H 57/0435* (2013.01); *F16H 57/0446* (2013.01); *F16H 57/0473* (2013.01); *F16H 61/0025* (2013.01); *F16H 61/688* (2013.01); *F04B 49/08* (2013.01); *F04B 49/20* (2013.01); *F04B 2205/05* (2013.01); *F15B 2211/20592* (2013.01); *F16D 2048/0245* (2013.01); *F16D 2048/0263* (2013.01); *F16D 2048/0266* (2013.01); *F16D 48/062* (2013.01); *F16D 2300/14* (2013.01); *F16H 2061/0037* (2013.01)

(58) Field of Classification Search
CPC ............. F16H 61/0025; F16H 61/0021; F16H 57/0446; F16D 25/123; F16D 48/0206; F16D 2300/14; F16D 48/02; F16D 48/062; F15B 11/17; F15B 2211/20592; F04B 49/065; F04B 49/08
See application file for complete search history.

(56) References Cited

U.S. PATENT DOCUMENTS

| | | | | |
|---|---|---|---|---|
| 9,777,827 B2* | 10/2017 | Ammler | ............... | F16H 61/0031 |
| 9,903,422 B2* | 2/2018 | Schuller | ............. | F16H 61/0031 |
| 10,443,707 B2* | 10/2019 | Spangler | ............ | F16H 57/0476 |
| 10,508,666 B2* | 12/2019 | Weinhardt | .............. | F16H 61/12 |
| 2006/0223670 A1 | 10/2006 | Nishikawa | | |
| 2008/0051251 A1 | 2/2008 | Ogata et al. | | |
| 2008/0223683 A1* | 9/2008 | Grethel | ............... | F16H 61/0031 |
| | | | | 192/48.614 |
| 2011/0135499 A1 | 6/2011 | Lee et al. | | |
| 2012/0121438 A1 | 5/2012 | Sah | | |
| 2014/0169994 A1* | 6/2014 | Schuller | ............... | F16H 57/0435 |
| | | | | 417/410.1 |
| 2016/0108977 A1 | 4/2016 | Ammler | | |
| 2022/0186794 A1 | 6/2022 | Wei | | |
| 2022/0205496 A1 | 6/2022 | Wei | | |

FOREIGN PATENT DOCUMENTS

| | | |
|---|---|---|
| CN | 103423141 A | 12/2013 |
| DE | 3518434 A1 | 11/1986 |
| DE | 102011118063 A1 | 8/2012 |
| DE | 102013008740 A1 | 11/2014 |
| DE | 102019123965 A1 | 3/2021 |
| DE | 102020125635 A1 | 4/2021 |
| EP | 1253341 A2 | 10/2002 |
| JP | 2002031079 A | 1/2002 |
| JP | 2018003786 A | 1/2018 |

\* cited by examiner

METHOD FOR ACTUATING A HYDRAULIC DEVICE

CROSS-REFERENCE TO RELATED APPLICATIONS

This application is the U.S. National Phase of PCT Appln. No. PCT/DE2021/100177 filed Feb. 23, 2021, which claims priority to DE 102020105820.9 filed Mar. 4, 2020, the entire disclosures of which are incorporated by reference herein.

BACKGROUND

A method for actuating a hydraulic device for a torque-transmitting device is described, for example, in DE 10 2019 130 158.0. The torque-transmitting device is designed as a double clutch and has a first and a second clutch, each of which can be actuated by a fluid pressure and each of which is hydraulically connected via a fluid tract to a pump device that provides the fluid pressure. The actuation of each clutch is controlled by a clutch valve assigned to the individual clutch. Furthermore, a cooling device is arranged to cool the first and second clutches. The pump device has a first and second pump. The first pump provides the first fluid pressure required to cool the first and second clutches, and the second pump provides the second fluid pressure required to actuate the clutch.

The second fluid pressure is maintained by repeatedly intermittently operating the second pump, thereby compensating for a loss of the second fluid pressure in the fluid tract. This post-pump process is known to occur at a predetermined secondary pump rotational speed of the second pump and continues until the second fluid pressure reaches a second fluid target pressure.

The determination of the secondary pump rotational speed to be set with the requirement of the most energy-saving and functionally safe operation of the second pump is complex due to the dependence on several influences, such as temperature, pressure leakage, and pump efficiency.

SUMMARY

The present disclosure, according to an exemplary embodiment, actuates a hydraulic device in a more energy-saving and reliable manner. A hydraulic device can set the required second fluid pressure faster and more accurately, as well as more independently of external influences. A torque-transmitting device can be controlled better and more energy-efficiently. A secondary pump rotational speed can be adaptively preset during operation of the torque-transmitting device. This can reduce the energy consumption of the pump device.

The actuation can include open-loop and/or closed-loop control of the hydraulic device.

The torque-transmitting device can be arranged in a drive train of a vehicle, in particular of a motor vehicle. The torque-transmitting device can have a clutch and/or a brake. The clutch can be a multiple clutch, in particular a double clutch. The torque-transmitting device can provide frictional torque transmission. The torque-transmitting device can include at least one frictionally engaged torque-transmitting element. The torque-transmitting device can be effective in a power-shiftable E-axle. The E-axle can have at least two switchable gear ratios. The torque-transmitting device can be connected to an electric motor on the input side.

The clutch can have a first clutch and a second clutch. The first and second clutches can be independently actuatable. A first clutch valve can be assigned to the first clutch for controlling actuation of the first clutch. A second clutch valve can be assigned to the second clutch for controlling actuation of the second clutch. The first and/or second clutch valve can be arranged between the pump device and the respective clutch in the fluid tract.

The torque-transmitting device can have a cooling device for cooling the torque-transmitting device, in particular the first and/or second clutch, with a cooling fluid. The cooling device can also be effective for cooling other components, for example an electric motor. The cooling device can be supplied by the first fluid pressure.

The pump device can include a first pump providing the first fluid pressure and a second pump providing the second fluid pressure. The first and second pumps can be operable by a common electric motor. A first direction of rotation of the pump device can provide the first fluid pressure and an opposite second direction of rotation of the pump device can provide the second fluid pressure. The electric motor can be operated independently of a rotational speed of the clutch. This allows a sufficient pump rotational speed to be applied. The first and second pumps can be arranged in a tandem configuration.

The hydraulic device can have at least one spring pressure accumulator as a hydraulic capacitor. The spring pressure accumulator can be assigned to one of the two clutches. Each clutch can also be assigned its own spring pressure accumulator.

The hydraulic device can have at least one check valve. The check valve can be assigned to one of the two clutches. Each clutch can also be assigned its own check valve.

The switchover process can be a post-pump process and the secondary pump rotational speed can be a post-pump rotational speed. Outside the switchover process, the primary pump rotational speed can be applied, or the pump device can be out of operation.

The secondary pump rotational speed can be set during the next switchover process with the specification of a reduction of the electrical pump power of the pump device to be provided for this purpose.

The secondary pump rotational speed to be preset calculated for the next switchover process is narrowed down to a value in a range of values between a minimum secondary pump rotational speed and a maximum secondary pump rotational speed. It is useful to define a minimum secondary pump rotational speed in order to limit the time period of the suspended primary pump rotational speed. For example, the pump device can suspend the provision of the first fluid pressure once the switchover process is ongoing. This interruption should, for example, be short in time. The specification of a maximum secondary pump rotational speed can be advantageous in order to relieve a rotational speed controller of the pump device and/or to avoid a maximum permissible pump rotational speed of the pump device.

During start-up operation of the hydraulic device, where the next switchover process is the first switchover process since the start of operation, the preset secondary pump rotational speed can correspond to a preset initial value. The initial value can be specified as constant or taken from a lookup table. The lookup table can indicate the dependence of the initial value on the second fluid pressure and/or temperature.

The second fluid target pressure can be a minimum second fluid pressure or a maximum second fluid pressure. The switchover process can be initiated when the second fluid pressure is below the minimum second fluid pressure or reaches it. The switchover process can be set when the second fluid pressure is above the maximum second fluid pressure or reaches it.

The electrical pump power can be calculated from the electrical pump voltage and the electrical pump current.

In an embodiment of the disclosure, the presetting of the secondary pump rotational speed in the next switchover process is effected via a reduction or increase compared to the secondary pump rotational speed in the preceding switchover process.

In an embodiment of the disclosure, the secondary pump rotational speed in the next switchover process is preset to a value dependent on the secondary pump rotational speed in the preceding switchover process and a rotational speed change value. The rotational speed change value can be preset, in particular be fixed. For example, the rotational speed change value can be 200 rpm. The rotational speed change value can be adaptively changeable during operation of the hydraulic device, in particular between the individual switchover processes.

In an embodiment of the disclosure, a first power value is calculated as an averaged electrical pump power over a reference period.

In an embodiment of the disclosure, the reference period is the time interval between the completion of the preceding switchover process and the completion of the switchover process preceding it in turn. The reference period can include operation in a first operating state. The reference period can also be limited exclusively to the duration of the preceding switchover process.

In an embodiment of the disclosure, the secondary pump rotational speed in the next switchover process is preset in a manner dependent on the first power value and a second power value which includes the electrical pump power of the pump device in the switchover process in turn preceding the preceding switchover process. The secondary pump rotational speed for the next switchover process can be calculated in a manner dependent on whether the first power value is greater than or equal to the second power value.

In an embodiment of the disclosure, the secondary pump rotational speed in the next switchover process is preset at least in a manner dependent on a secondary pump rotational speed in the preceding switchover process.

In an embodiment of the disclosure, the secondary pump rotational speed in the next switchover process is preset at least in a manner dependent on the secondary pump rotational speed in the preceding switchover process and a secondary pump rotational speed in the switchover process in turn preceding the preceding switchover process. The secondary pump rotational speed for the next switchover process can be calculated in a manner dependent on whether the secondary pump rotational speed in the preceding switchover process is greater than or equal to the secondary pump rotational speed in the switchover process in turn preceding the preceding switchover process.

In an embodiment of the disclosure, the preceding switchover process immediately precedes the next switchover process.

In an embodiment of the disclosure, the fluid tract has a first fluid branch for supplying the torque-transmitting device with the first fluid pressure and a second fluid branch, which is separated at least in portions from the first fluid branch, for supplying the torque-transmitting device with the second fluid pressure. The second fluid pressure can be greater than the first fluid pressure.

Further advantages and advantageous embodiments of the disclosure result from the description of the figures and the drawings.

BRIEF DESCRIPTION OF THE DRAWINGS

The disclosure is described in detail below with reference to the drawings. Specifically.

DETAILED DESCRIPTION

Figure 1:
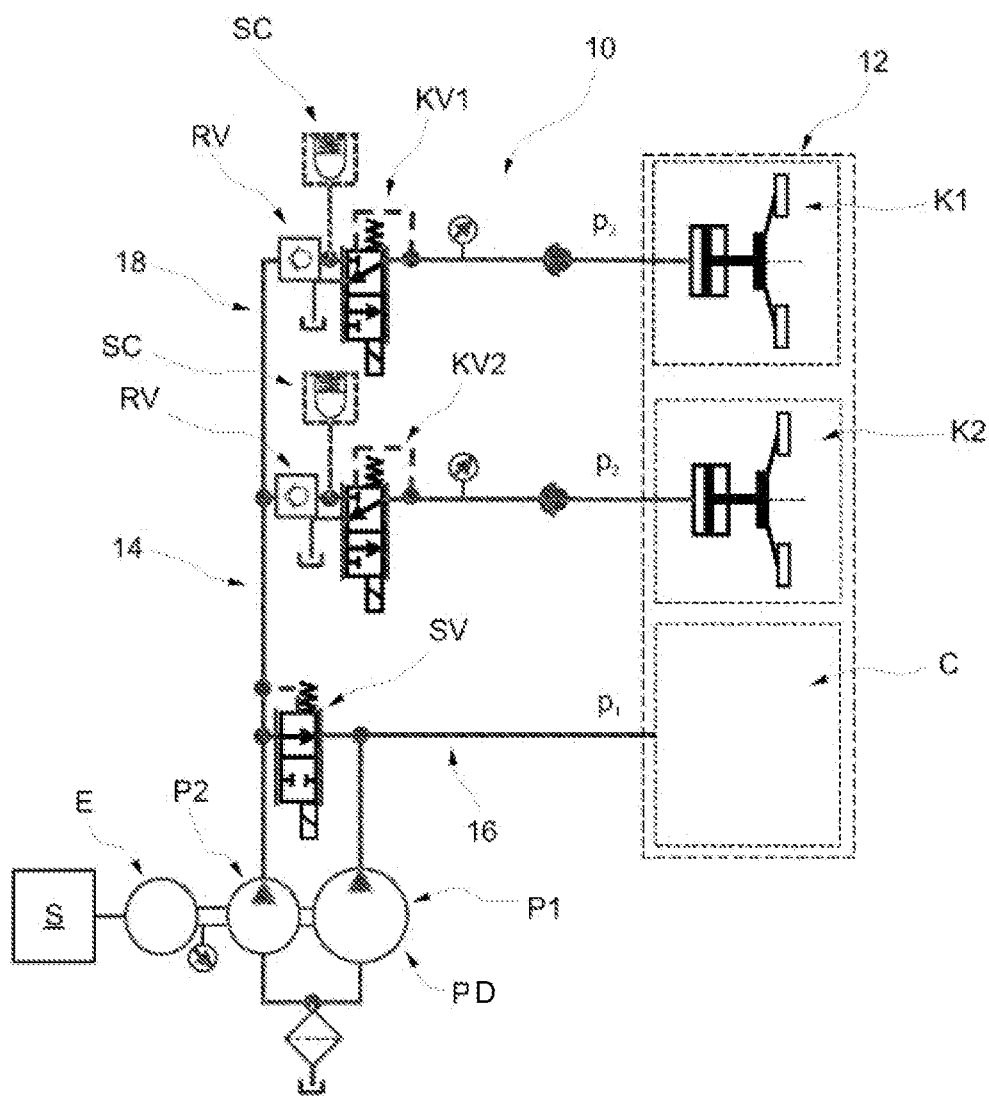
FIG. 1: shows a block diagram of a hydraulic device for a torque-transmitting device for execution of a method in an exemplary embodiment of the disclosure.

FIG. 1 shows a block diagram of a hydraulic device 10 for a torque-transmitting device 12 for execution of a method in an exemplary embodiment of the disclosure. The torque-transmitting device 12 is designed as a double clutch and is arranged in a drive train of a vehicle, in particular a motor vehicle, and has a hydraulically actuatable first clutch K1 and a hydraulically actuatable second clutch K2 for alternating torque transmission between a drive element, for example an internal combustion engine and/or an electric motor, and a transmission. The torque-transmitting device 12 may be arranged in a power-shiftable E-axle of the vehicle.

Furthermore, the torque-transmitting device 12 comprises a hydraulically operated cooling device C for cooling at least one of the two clutches K1, K2. The first clutch K1, the second clutch K2, and also the cooling device C are hydraulically connected to the hydraulic device 10 via a fluid tract 14.

The hydraulic device 10 comprises an electrically operated pump device PD having a first pump P1 and a second pump P2. The first and second pumps P1, P2 are driven by a common electric motor E. A first fluid branch 16 is assigned to the first pump P1 and a second fluid branch 18 is assigned to the second pump P2. The first pump P1 can be effective in a first operating state of the pump device PD, having a primary pump rotational speed to provide the first fluid pressure $p_1$. The second pump can be effective in a second operating state of the pump device PD, having a secondary pump rotational speed to provide the second fluid pressure $p_2$.

Furthermore, a system pressure valve SV is provided, downstream of which there are arranged a first clutch valve KV1 assigned to the first clutch K1, and a second clutch valve KV2 assigned to the second clutch K2 and arranged in parallel with the first clutch valve KV1.

The first pump P1 can provide the first fluid pressure $p_1$ required for clutch cooling via the cooling device C via the first fluid tract 16. The second pump P2 can provide the second fluid pressure $p_2$ required to actuate the first and second clutches K1, K2 via the second fluid tract 18. The first clutch valve KV1 is actuatable to control the clutch actuation of the first clutch K1, and the second clutch valve KV2 is actuatable to control the clutch actuation of the second clutch K2.

Upstream of both the first clutch valve KV1 and the second clutch valve KV2, one spring pressure accumulator SC in each case is connected as hydraulic capacitor. In turn, a check valve RV is arranged in each case upstream of the respective spring pressure accumulator SC. This allows the second pump P2 to increase the second fluid pressure in the second fluid branch 18, thereby charging the spring pressure accumulator SC, wherein a fluid pressure drop towards the second pump P2 is in turn reduced by the corresponding check valve RV.

However, pressure leakage can also cause a small pressure drop of the second fluid pressure $p_2$. A control unit S can, in a manner dependent on a ratio between the second fluid pressure $p_2$ and a second fluid target pressure, initiate, as required and repeatedly, a switchover process during which the second operating state is assumed. In this regard, the first operating state can be temporarily replaced by the second operating state. The switchover process can be a post-pump process by which the second fluid pressure $p_2$ is brought back to the target pressure level. The secondary pump rotational speed can then be a post-pump rotational speed of the second pump P2.

Figure 2:
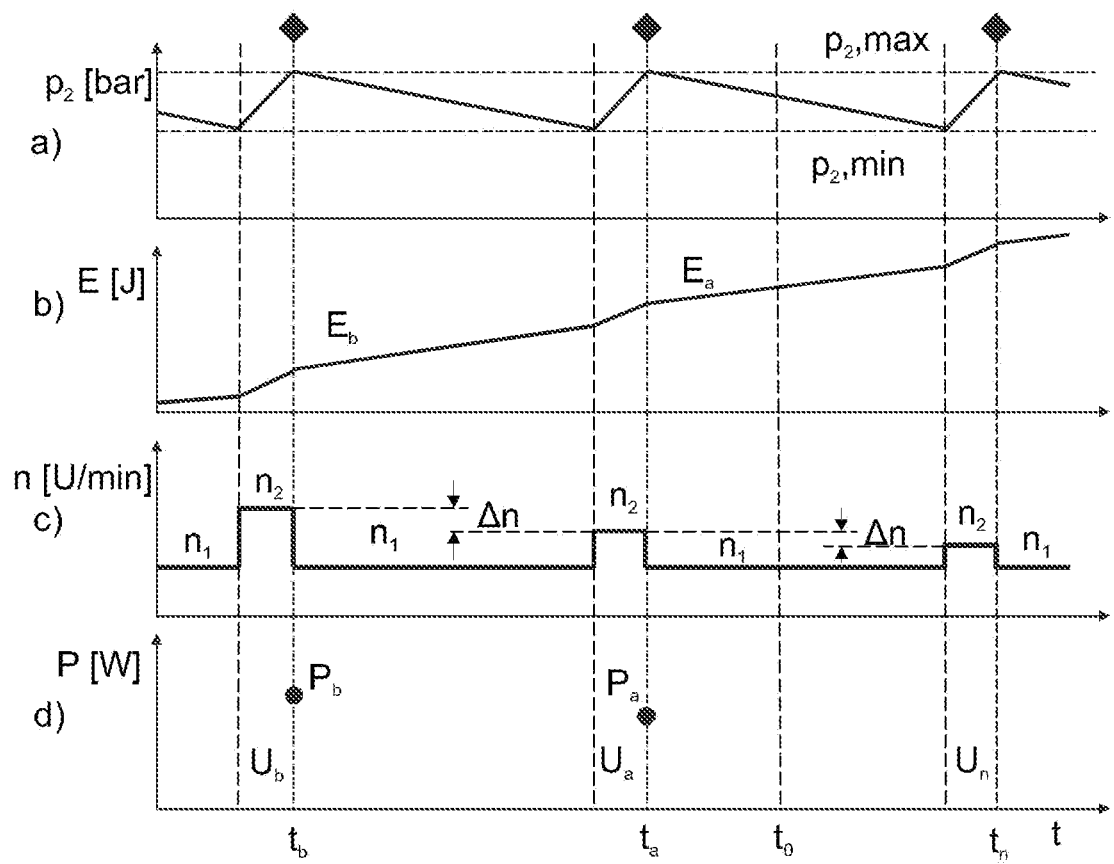
FIG. 2: shows curve diagrams of various parameters when a method is carried out in the exemplary embodiment of the disclosure.

FIG. 2 shows curve diagrams of various parameters regarding the execution of a method in the exemplary embodiment of the disclosure. FIG. 2 a) shows the temporal course of the second fluid pressure $p_2$, FIG. 2 b) the temporally corresponding course of the electrical energy E of the pump device PD, FIG. 2 c) the temporally corresponding course of the pump rotational speed n, and FIG. 2 d) the temporally corresponding course of the electrical pump power P of the pump device PD.

During operation of the hydraulic device 10, the secondary pump rotational speed $n_2$ is set by initiating the switchover process as soon as the second fluid pressure P2 falls below a second fluid target pressure, in this case a minimum second fluid pressure $p_{2,min}$. The particular switchover process is set when the second fluid pressure $p_2$ reaches or exceeds a maximum second fluid pressure $p_{2,max}$.

Provided that there is a point in time to during operation of the hydraulic device 10, there is at least one preceding switchover process $U_a$, a switchover process $U_b$ preceding this in turn, and a next switchover process $U_n$ following the point in time $t_0$. The switchover process $U_b$ is completed at the point in time $t_b$ and the switchover process $U_n$ is completed at the point in time $t_a$.

For the next switchover process $U_n$, the method described calculates, during operation of the hydraulic device 10, the secondary pump rotational speed $n_2$ to be set for the next switchover process $U_n$ at least in a manner dependent on a first power value $P_a$ characterizing the electrical pump power P of the pump device PD in the preceding switchover process $U_a$. As a result, the energy consumption of the pump device PD can be reduced, and the hydraulic device 10 can set the required second fluid pressure $p_2$ faster and more accurately. The secondary pump rotational speed $n_2$ is thus adaptively preset during operation of the torque-transmitting device 12. This makes the second fluid pressure $p_2$ less susceptible to external influences.

The secondary pump rotational speed $n_2$ is set in the next switchover process $U_n$ with the specification of a reduction of the electrical pump power P of the pump device PD to be provided for this purpose, in that the secondary pump rotational speed $n_2$ in the next switchover process $U_n$ is set to differ from the secondary pump rotational speed $n_2$ of the preceding switchover process $U_a$ by a rotational speed change value $\Delta n$, i.e. lower or higher, as required. For example, the rotational speed variation value $\Delta n$ can be 200 rpm.

The first power value $P_a$ is calculated as an averaged electrical pump power over a reference period as follows $$P_a = \frac{E_a - E_b}{t_a - t_b} \quad (1)$$

with the electrical energy $E_a$ consumed by the pump device PD at the point in time $t_a$ and the electrical energy $E_b$ consumed by the pump device PD at the point in time $t_b$.

The reference period is the time interval $t_a$-$t_b$ between the completion of the preceding switchover process $U_a$ and the completion of the switchover process $U_b$ preceding it in turn.

Preceding the determination of the first power value $P_a$, a second power value $P_b$ corresponding to the averaged electrical pump power in a comparable period up to the point in time $t_b$ has already been calculated analogously.

Figure 3:
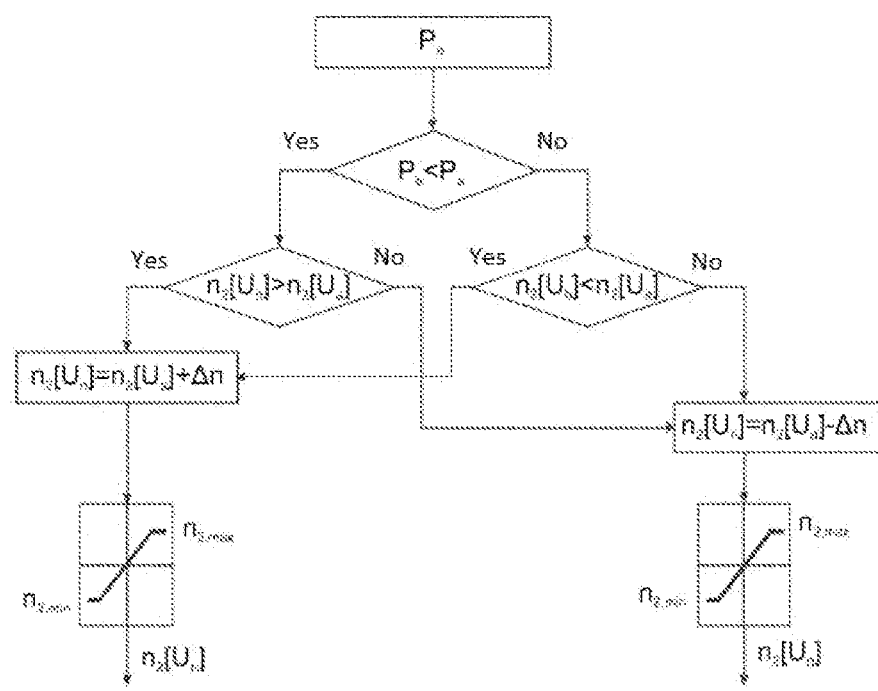
FIG. 3: shows a flow chart of a method in the exemplary embodiment of the disclosure.

The calculation of the secondary pump rotational speed $n_2$ to be used for the next switchover process $U_n$ can, for example, be carried out in a case-dependent manner according to the flow chart in FIG. 3. Here, the first power value $P_a$ is first calculated according to (1). Then, the comparison between the first power value $P_a$ and the second power value $P_b$ is made. The subsequent query of the secondary pump rotational speed $n_2$ is case-dependent according to whether the first power value $P_3$ is smaller or greater than the second power value $P_b$.

If the second power value $P_b$ is smaller than the first power value $P_a$, for example, it is then queried whether the secondary pump rotational speed $n_2$ in the switchover process $U_b$ is greater than the secondary pump rotational speed $n_2$ in the switchover process $U_a$. If this condition is fulfilled, the secondary pump rotational speed $n_2$ for the next switchover process $U_a$ is set higher than the secondary pump rotational speed $n_2$ of the preceding switchover process $U_a$ by the rotational speed change value $\Delta n$.

In this regard, the secondary pump rotational speed $n_2$ to be preset calculated for the next switchover process $U_n$ is narrowed down to a value in a range of values between a minimum secondary pump rotational speed $n_{2,min}$ and a maximum secondary pump rotational speed $n_{2,max}$. The determination of the minimum secondary pump rotational speed $n_{2,min}$ is useful to limit the switchover process in time. The specification of the maximum secondary pump rotational speed $n_{2,max}$ can be advantageous to relieve a speed controller of the pump device PD and/or to avoid a maximum permissible secondary pump rotational speed of the pump device PD.

If the second power value $P_b$ is smaller than the first power value $P_a$, for example, and the secondary pump rotational speed $n_2$ in the switchover process $U_b$ is smaller than or equal to the secondary pump rotational speed $n_2$ in the switchover process $U_a$, then the secondary pump rotational speed $n_2$ for the next switchover process $U_n$ is set lower than the secondary pump rotational speed $n_2$ of the receding switchover process $U_a$ by the rotational speed change value $\Delta n$.

The change in secondary pump rotational speed $n_2$ of the next switchover process $U_n$ for other possible states of the case conditions can be taken directly from the diagram.

LIST OF REFERENCE CHARACTERS

10 Hydraulic device
12 Torque-transmitting device
14 Fluid tract
16 First fluid branch
18 Second fluid branch
C Cooling device E Electric motor
K1 First clutch
K2 Second clutch
KV1 First clutch valve
KV2 Second clutch valve
PD Pump device
P1 First pump
P2 Second pump
S Control device
SC Spring pressure accumulator
SV System pressure valve
$p_1$ First fluid pressure
$p_2$ Second fluid pressure
$p_{2,min}$ Minimum second fluid pressure
$p_{2,max}$ Maximum second fluid pressure
P Electrical pump power
$P_a$ First power value
$P_b$ Second power value
$n_1$ Primary pump rotational speed
$n_2$ Secondary pump rotational speed
$n_{2,min}$ Minimum secondary pump rotational speed
$n_{2,max}$ Maximum secondary pump rotational speed
$\Delta n$ Rotational speed change value
$U_a$ Switchover process
$U_b$ Switchover process
$U_n$ Next switchover process

The invention claimed is:

1. A method for actuating a hydraulic device, which provides a hydraulic supply to a torque-transmitting device, comprising:
    operating an electrically operated pump device in a first operating state, wherein the first operating state has a primary pump rotational speed that provides a first fluid pressure to the torque-transmitting device via a fluid tract;
    based on a second fluid pressure and a second fluid target pressure, initiating a switchover process to operate the electrically operated pump device in a second operating state, wherein the second operating state has a secondary pump rotational speed that provides the second fluid pressure to the torque-transmitting device via the fluid tract; and
    during the operation of the hydraulic device, determining the secondary pump rotational speed for the switchover process based on a first power value, the first power value includes electrical pump power of the pump device in a preceding switchover process.

2. The method according to claim 1, further comprising determining the secondary pump rotational speed for the switchover process based additionally on a secondary pump rotational speed for the preceding switchover process.

3. The method according to claim 2, further comprising determining the secondary pump rotational speed for the switchover process based additionally on a rotational speed change value.

4. The method according to claim 1, further comprising calculating the first power value as an averaged electrical pump power over a reference period.

5. The method according to claim 4, wherein reference period is a time interval between a completion time of the preceding switchover process and a completion time of a further switchover process preceding the switchover process in turn.

6. The method according to claim 1, further comprising determining the secondary pump rotational speed for the switchover process based additionally on a second power value, the second power value includes electrical pump power of the pump device in a further switchover process preceding the preceding switchover process in turn.

7. The method according to claim 3, further comprising determining the secondary pump rotational speed for the switchover process by combining the rotational speed change value and the secondary pump rotational speed in the preceding switchover process.

8. The method according to claim 2, further comprising determining the secondary pump rotational speed for the switchover process based additionally on a secondary pump rotational speed for a further switchover process preceding the preceding switchover process in turn.

9. The method according to claim 1, wherein the preceding switchover process immediately precedes the switchover process.

10. The method according to claim 1, wherein the fluid tract has a first fluid branch for supplying the torque-transmitting device with the first fluid pressure and a second fluid branch, which is separated at least in portions from the first fluid branch, for supplying the torque-transmitting device with the second fluid pressure.

11. A method for actuating a hydraulic device, which provides a hydraulic supply to a torque-transmitting device, comprising:
    operating a first pump in a first operating state, wherein the first operating state has a primary pump rotational speed that provides a first fluid pressure to the torque-transmitting device via a fluid tract;
    based on a second fluid pressure being less than or equal to a target fluid pressure, initiating a switchover process by operating a second pump in a second operating state, wherein the second operating state has a secondary pump rotational speed that provides the second fluid pressure to the torque-transmitting device via the fluid tract;
    during operation of the hydraulic device, determining the secondary pump rotational speed for the switchover process based on a first power value for the second pump in a preceding switchover process;
    based on the second fluid pressure being greater than or equal to a second target fluid pressure, stopping operation of the second pump; and
    determining the first power value based on electrical energy consumed by the second pump at a completion time of the preceding switchover process and electrical energy consumed by the second pump at a completion time of a further preceding switchover process preceding the preceding switchover process in turn.

12. The method of claim 11, wherein the second target fluid pressure is greater than the target fluid pressure.

13. The method of claim 11, further comprising determining the secondary pump rotational speed for the switchover process based additionally on a second power value for the second pump in the further preceding switchover process preceding the preceding switchover process in turn.

14. The method of claim 13, further comprising determining the secondary pump rotational speed for the switchover process based additionally on a secondary pump rotational speed for the preceding switchover process and a secondary pump rotational speed for the further preceding switchover process.

15. The method of claim 14, further comprising determining the secondary pump rotational speed for the switchover process based additionally on combining a rotational speed change value and the secondary pump rotational speed for the preceding switchover process.

16. The method of claim 11, further comprising, based on the second fluid pressure being less than or equal to the target fluid pressure, stopping operation of the first pump.

17. The method of claim 11, further comprising, based on the second fluid pressure being greater than or equal to the second target fluid pressure, operating the first pump in the first operating state.

18. The method of claim 11, further comprising, upon determining that the switchover process is a first switchover process after initiation of operation for the hydraulic device, determining the secondary pump rotational speed for the switchover process based on a preset initial value.

19. The method of claim 11, wherein the preceding switchover process immediately precedes the switchover process.

* * * * *